United States Patent [19]
Sadel

[11] 3,731,186
[45] May 1, 1973

[54] RADIO FREQUENCY MEASUREMENTS

[76] Inventor: Hans Sadel, 299 Park Avenue, Weehawken, N.J. 07097

[22] Filed: June 1, 1971

[21] Appl. No.: 148,599

[52] U.S. Cl. ................................324/57 N, 331/78
[51] Int. Cl. ...........................................G01r 17/04
[58] Field of Search.......................324/57 N; 331/78

[56] References Cited

UNITED STATES PATENTS

| | | | |
|---|---|---|---|
| 3,281,711 | 10/1966 | Kees et al. | 331/78 |
| 1,914,414 | 6/1933 | Fairchild | 324/57 N |
| 2,773,186 | 12/1956 | Herrmann, Jr. | 324/57 N |
| 2,883,616 | 4/1959 | Sabaroff | 324/57 N |
| 2,989,700 | 6/1961 | Most | 324/103 |
| 3,102,231 | 8/1963 | Wolf | 324/57 N |

OTHER PUBLICATIONS

Figure 1:
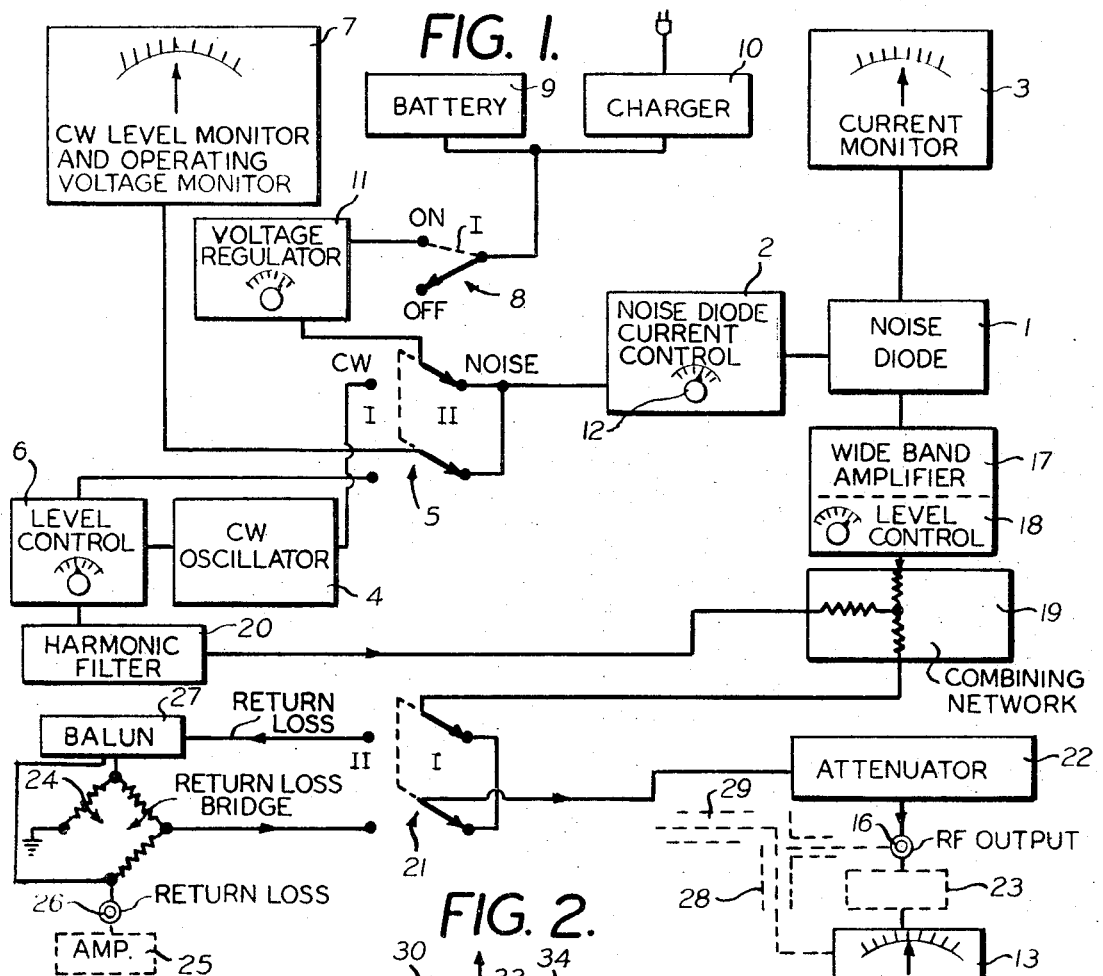
Figure 2:
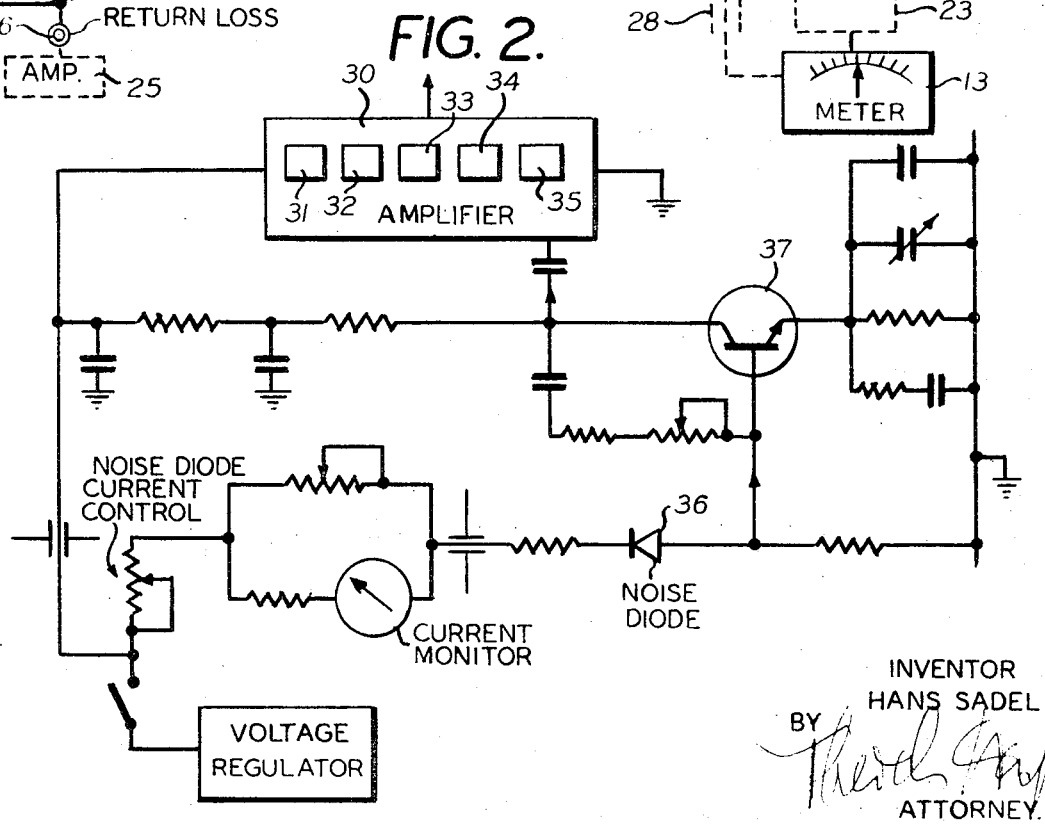

Ammerman, "The Direct Measurement of Bandwidth," AIEE Paper 50-5, Nov. 1949 [pp. 1-4 & FIG. 1 & 2]

Chasek, "Avalanche Diodes . . . ," Electronics, Jan. 19, 1970 [pp. 87-91]

Edwards, "White Noise," Electronics World, Nov. 1962 [pp. 40-42]

The General Radio Experimenter, Vol. 26, No. 7, Dec. 1951 [p. 1 & 7]

Primary Examiner—John S. Heyman
Attorney—George Gottlieb, Michael I. Rackman and James Reisman

[57] ABSTRACT

There is disclosed a method for determining the absolute response of a signal strength meter, or the absolute response of a device under test with the use of a previously calibrated signal strength meter. In the former case, a continuous wave signal of predetermined amplitude and frequency is applied to the input of the meter while it is tuned to the frequency of the continuous wave signal. A white noise signal is then applied to the input of the meter while it is tuned to the same frequency, and the level of the white noise signal is adjusted so that the meter reading is the same as the reading taken for the continuous wave signal. Thereafter, as the signal strength meter is tuned throughout the frequency range of interest, the absolute response of the signal strength meter can be determined by observing the meter reading even though the bandwidth of the filter of the meter may not be known. In a similar manner, a previously calibrated meter can be used to measure the absolute response of a device under test to whose input there are applied the white noise and continuous wave signals, and whose output is connected to the meter.

4 Claims, 2 Drawing Figures

INVENTOR
HANS SADEL
BY
ATTORNEY.

RADIO FREQUENCY MEASUREMENTS

This invention consists of a method and apparatus for R.F. measurements, wherein several signals are produced, including a white noise signal covering a range of frequencies, and a continuous wave (CW) signal of a frequency within this range; and wherein the C.W. signal is applied as a reference level for the white noise signal, and reference signals are derived from the white noise signal for at least a portion of its spectrum.

The conventional method of making basic measurements on communications and other electronic equipment, has been in the use of a single frequency, tunable generator and a wide-band receiver or indicator. In the television industry, however, it became necessary to accurately measure the level of a narrow-band signal in the presence of a wide spectrum of similar signals. This led to the development of portable, tunable, narrow-band signal strength meters, also called field strength meters or R.F. voltmeters. With this type of meter being widely accepted and present in the television and communications industry, it has also become practical to use a wide-band signal generator for many measurements.

Thus, for example, a sweep frequency generator is used in conjunction with a tunable, narrow-band signal strength meter to measure the response of an amplifier, a filter or other components, especially as a function of frequency; however, the low sweep frequency of most commonly available sweep frequency generators, may cause the needle of the signal strength meter to vibrate, thus making accurate readings difficult. Furthermore, the detector circuit of the signal strength meter may have a narrow band width and long time constants, causing it to be incapable of developing the full signal amplitude when the signal generator is adjusted to sweep a wide band; the signal will sweep through the pass band too quickly; and generators not having a constant sweep rate throughout their frequency range, will cause a signal strength meter of fixed bandwidth to indicate the signal amplitude with varying accuracy throughout the frequency range. Since, in practice, it is frequently desirable to set the sweep width to sweep the complete VHF TV spectrum (54 to 216 MHz), it has been found that the sweep rate at the high frequency end of the spectrum is faster than at the low frequency end, causing the signal to remain in the pass band of the meter a shorter time than when turned to the low end. This results in a lower indication on the signal strength meter when it is tuned to the high frequency end than when it is tuned to the low end of the spectrum.

Generally, most of the available wide band generators have one or more of the following disadvantages when used in conjunction with ordinary signal strength meters:

1. The signal level is very low as, for example, in noise generators intended for the measuring of noise figures.
2. In sweep frequency generators, the signal strength meter may see, in effect, a pulsed signal, causing needle vibration.
3. The signal strength meter may also see, in effect, a signal which varies in amplitude through the spectrum, as would be caused by a non-linear sweep rate.
4. No convenient method of making an absolute level determination is provided.
5. The generator is not truly portable to the extent of being light in weight, small in size, and having a self-contained power supply.

One of the objects of the invention is to reduce or eliminate these drawbacks by providing a dual-type of signal generator which selectively emits either white noise or a CW signal, combined with a radio frequency bridge and an attenuator.

Another object of the invention is to calibrate signal strength meters, and further, in conjunction with a signal strength meter, to measure R.F. parameters of many active devices such as amplifiers and mixers, and of passive devices such as attenuators, filters, cables and other transmission lines, splitters and terminations.

These and other objects of the invention will be more fully apparent from the drawing annexed herewith, in which FIG. 1 shows a circuit diagram embodying certain principles of the invention.

FIG. 2 exemplifies a portion of FIG. 1, also in a diagramatical fashion.

The circuitry of FIG. 1 is adapted to perform a number of different measurement operations.

An important application is in the calibration of signal strength meters.

Until now, signal strength meters were calibrated for response by carefully tuning both a calibrated signal generator and the signal strength meter to each frequency of interest, often 10 to 20 frequencies, and noting the error in the deflection of the signal strength meter. Thus, point by point, the frequency response of the meter was laboriously determined.

In accordance with one embodiment of the invention, a white noise signal, offering the convenience of a signal of constant amplitude and continuity over the whole spectrum, is calibrated with a continuous wave signal. If a white noise signal were used alone to calibrate a narrow-band signal strength meter, it would be necessary to know the absolute level of the white noise signal, the detector efficiency of the signal strength meter for white noise as well as for a CW signal, and the bandwidth of the signal strength meter. These three parameters are very difficult to measure, especially in the VHF and UHF ranges.

In accordance with the invention, an absolute reference level is established by means of an internal CW signal, after which the signal strength meter is tuned to each frequency of interest.

In practice, and in connection with the circuitry of FIG. 1, a white noise signal derived from the output of a white noise generator, such as a diode as schematically indicated in FIG. 1, at 1, is carefully adjusted by current control 12 so that, over the entire frequency range of interest, as observed on current monitor 3, there will be less than, say, 1 dB variation above or below a predetermined value, when measured with a signal strength meter having a bandwidth of 0.5 MHz. The white noise signal output level can then be adjusted by the operator through a range sufficient to insure that signal strength meters having bandwidths between 0.1 and 2.0 MHz, can be brought to the same deflection as that caused by a 1 millivolt CW signal applied to the input.

According to FIG. 1, the CW signal is the output of fixed frequency oscillator 4, the frequency of which might be chosen to be anywhere in the frequency range of interest which is of convenience to the user. For instance, it has been found to be practical for the television industry to use as a reference frequency, a frequency between channels 4 and 5. Oscillator 4 may be crystal controlled. In the final alignment of the circuit of FIG. 1, the output level of the CW signal is precisely set, providing a reference signal level which is its principal function. For this purpose switch 5 is put into position I and level control 6 is adjusted while level monitor 7 is being observed. At the same time, switch 8 is in position I connecting battery 9 — which may be chargeable from charger 10 — over voltage regulator 11 to CW oscillator 4.

With switch 5 in position II, the white noise circuit of FIG. 2 is used for calibration or any other measurements, in accordance with the invention. In this position of switch 5, voltage level monitor 7 and voltage regulator 11 are operative, under control of noise current control 2, to energize noise diode 1. In position I of switch 5, oscillator 4 is in use, and its output is monitored on 7, which is located on the front panel of the device supporting the circuitry of FIG. 1, and which is to provide a continuous, accurate visual indication of the output level for the operator. For the television industry a common reference level is 1 millivolt across 75 ohms.

In position II of switch 5 noise generator 1 is in use, and in accordance with the invention, a signal strength meter to be calibrated, as schematically indicated at 13, is connected to RF output terminal 16. On the other end, noise diode 1 is connected over wide-band amplifier 17 — which may contain level control 18 — to combining network 19, which at one side is connected over harmonic filter 20 to level control 6 of CW oscillator 4. On the other side, combining network 19 connects through switch 21 and attenuator 22 to RF output terminal 16.

Now, selectively, and in accordance with the invention, either a CW signal of predetermined reference level, or a white noise signal of adjustable level, is connected to the signal strength meter to be calibrated; and after having established an absolute reference with the internal CW generator 4, in position I of switch 5, it only becomes necessary, in position II of switch 5, to adjust the level of the white noise signal at the CW frequency by varying level control 18, and then to tune the signal strength meter to each frequency of interest. In this case, the white noise generator 1, emitting a signal of constant amplitude throughout the frequency range of interest, will result in the same constant deflection of signal strength meter 13 throughout its frequency range, if the response of that signal strength meter is flat, even while the meter is being tuned. Since the deflection is constant, the electrical and mechanical time constants of the signal strength meter, are much less of a problem than is usually encountered when a conventional method of measurement is used.

With signal strength meter 13 connected to terminal 16, and receiving in position II of switch 5, the white noise signal derived from generator 1 will indicate a reading which is dependent on its receiver bandwidth: Meters having a larger bandwidth will accept more of the white noise signal spectrum, and thus indicate a stronger signal. It may be expected that signal strength meters, even of the same make and model, have significant differences in bandwidth.

In accordance with the invention, this problem is dealt with in the following manner:

First, in position I of switch 5, the signal strength meter, or any other measurement instrument to be evaluated, is switched to the CW output signal derived from generator 4, and to which all signal strength meters respond alike when tuned to it, regardless of their bandwidth. This is because the CW signal is extremely narrow as compared to the bandwidth of any signal strength meter, and all of the CW signal energy is received by the meter. Since in accordance with the invention, the CW signal output level has been accurately set as explained previously, the signal strength meter being calibrated must be adjusted to indicate this value, or its error noted.

Second, in position II of switch 5, the signal strength meter, or any other instrument to be calibrated, is switched to the white noise signal derived from generator 1, while the signal strength meter under calibration is left tuned to the CW signal frequency.

Now, by using the variable output control 18 of the noise signal, and step attenuator 22, the reading on signal strength meter 13 is adjusted to the exact reading observed with the CW signal. While each manufacturer's signal strength meter will have a different bandwidth which will cause different output indications, this level adjustment eliminates the effect of the meter's bandwidth on the indication. The white noise signal level is simply adjusted to produce exactly the same indication which the CW signal has produced. Now, as the signal strength meter 13 is tuned through its frequency range, this meter, without any further adjustment, will continuously indicate a response to the white noise signal; and since the white noise signal output is essentially the same at all points throughout the frequency range of interest, the deviation appearing on the signal strength meter, from the value previously determined as the reference level at the CW reference frequency, constitutes directly the frequency response of the signal strength meter under calibration, provided the bandwidth of the meter is the same throughout its tuning range; and as quickly as the meter can be tuned to other frequencies, data can be acquired for plotting a complete frequency response characteristic of the meter.

The particular frequency of the greatest, or of the least, response within the frequency range of interest, is quickly found by merely turning the signal strength meter to the frequency of the greatest, or of the least, deflection. At the same time, the CW signal which has an accurately known absolute level and is completely received by all signal strength meters, is instantly and always available from the circuit according to my invention, permitting an absolute level reference point to be established in the frequency range of the signal strength meter. Thus, without cable changing or rearranging any external circuitry, by operating switch 5, level control 18 and adjustment of attenuator 22, the complete frequency response of the meter under test is very quickly determined.

While in this part of the application of the invention, the CW and white noise signals have been applied over certain common elements such as combining resistance network 19, switch 21 and step attenuator 22, to a common RF output terminal, the invention is not limited to the particular circuit separations and connections shown and described, nor to the specific types of circuit elements involved; but it may also be applied in another appropriate way or manner, without departing from the scope of the disclosure.

One of the most frequent evaluations required in the communications and television industry is the measurement of the frequency response of components such as the gain or loss of amplifier, filters, cables and other transmission lines.

Until now, the frequency response of narrow- and wide-band amplifiers, filters, cables and other components in the VHF and UHF range, was determined by using various methods and apparatus, most commonly the following:

1. A manually tuned CW generator and a manually tuned receiver requiring a laborious tuning procedure.
2. A sweep frequency generator, a detector, and a triggered or synchronized-sweep oscilloscope, from which it is usually difficult to make accurate visual readings to permit transfer to a permanent record.

In this particular application of the invention, a system such as outlined with respect to FIG. 1 is applied in connection with an ordinary field strength meter, to determine the response of an amplifier, filter, or other frequency-dependent circuit component. In this case, too, after having selected a suitable reference level — as explained previously —, the signal strength meter such as shown in FIG. 1 at 13, is tuned through the frequency range of interest; at the frequencies of interest, the operator stops and reads the meter, and the problems and solutions are similar to those discussed above in connection with the calibration of signal strength meters, in general. Here, too, the white noise signal generator 1, emitting a signal of constant amplitude throughout the frequency range concerned, will cause the output spectrum of the amplifier or filter, schematically indicated in FIG. 1 at 23, to assume the shape of the frequency response characteristics curve of the amplifier or filter concerned.

More specifically, and in accordance with the procedure previously outlined for meter calibration, the absolute level of the white noise signal at the input of unit 23, which in this case is terminal 16, is adjusted in accordance with the bandwidth of the signal strength meter 13 so as to give a particular reference output at one frequency such as 0 dBmV. Readings of the meter 13 at all other frequencies, throughout the frequency range of interest, will indicate not only the relative frequency response of unit 23 under test, but also its gain or loss.

Since the white noise signal is of constant amplitude throughout the frequency range of interest, the signal strength meter will continuously indicate the gain or loss of the amplifier, or filter, even while the signal strength meter is being tuned. Thus, the meter's electrical and mechanical time constants pose much less of a problem than is usually encountered in the use of conventional equipment and methods.

Furthermore, any error due to mistuning of the signal strength meter, caused to a CW signal generator, is inconsequential, if not outright excluded; so is the problem of the drift of either the CW generator or the signal strength meter, or both.

In the practical application of this part of the invention, first, the amplifier or filter to be evaluated is bypassed; and the white noise signal, at terminal 16, is directly connected to the field strength meter indicated at 13, at any convenient frequency setting of the meter. The white noise signal is then adjusted, by control 16 and attenuator 22, for a convenient reading of reference level on meter 13, such as a unity calibration mark on a voltage scale, or a zero mark on a decibel scale. Next, unit 23 to be tested, is connected between terminal 16 and meter 13 as schematically indicated at 23. The meter now directly indicates the gain or loss of unit 23; and as quickly as the signal strength meter can be tuned to other frequencies, the response level may be observed, or data can be acquired for plotting a frequency response characteristic showing gain or loss through the pass band, and attenuation in the stop band.

High and low values of the frequency response characteristic for the unit under test, and their frequencies, are quickly found, merely by tuning the signal strength meter to maximum and minimum deflections.

Another and rather important application embodying the invention is in the field of return loss measurements.

Until now, the condition for matching a load to a source was usually measured in terms of VSWR, especially if the precise nature of the load was of interest, for example, from the point of view of the design engineer. In the case, however, that only a qualitative, instead of a quantitative, measure of matching condition is required, it often becomes expedient to measure indirectly that power which a mismatched load does not absorb, as compared to that power which is a perfectly matched load would absorb from the same source. (This unabsorbed power is spoken of as reflected power. When compared directly to that power which a perfectly matched load would absorb, the ratio is called return loss).

In the past, return loss measurements have been made with the use of various methods and apparatus, most commonly the following:

1. A manually tuned CW signal generator, a return loss bridge, a detector, and a calibrated indicator, usually requiring the signal generator's output level to be monitored and readjusted to compensate for the change of output level at different frequencies.
2. A sweep frequency signal generator, a return loss bridge, a detector and a triggered or synchronized-sweep oscilloscope, from which it is usually difficult to make accurate visual readings for transfer to a permanent record. Linear oscilloscope displays have a limited dynamic range of adequate resolution, and logarithmic displays have inadequate resolution throughout the dynamic range, on most equipment.

In both of the above methods, the cost of equipment which would permit acceptable accuracy of measurement in the VHF range, is quite high; the equipment is frequently not conveniently portable with respect to size, weight and power source, and often the circuit arrangements are more complex than required for the practical use of these devices.

In accordance with a further embodiment of this invention, also illustrated in FIG. 1, which may or may not be used together with the previous or any other embodiments, the return loss of electrical components is measured, having a nominal impedance which is comparable to that of the impedance bridge in this invention.

An example of such a bridge is indicated in FIG. 1 at 24, and it can be designed for any impedance such as 50, 70, 75 and 90 ohms. Electrical components which can be measured with this embodiment of the invention are: Attenuators, input and output impedances of amplifiers, filters and mixers, resistors, terminated cables or other transmission lines, terminations, etc.

In order to determine the return loss of the unit schematically indicated in FIG. 1 at 25, and connected to return loss terminal 26, switch 21 is put into position 11 connecting the output of resistance network 19 over balun 27 to diagonal junction points of bridge 24, while a diagonal point of the bridge is connected over terminal 26 to unit 25. Another junction point of bridge 24 is connected, in position 11 of switch 21, over step attenuator 22 and terminal 16 to an ordinary signal strength meter, such as schematically indicated in FIG. 1 at 13.

The return loss of unit 25 is now determined in accordance with the invention, by tuning signal strength meter 13 through the frequency range of interest, after having established a reference level, stopping at those frequencies desired, and reading the signal strength meter as explained in the previous applications of the invention. The white noise generator 1, emitting a signal of fixed and constant amplitude to return loss bridge 24, throughout the frequency range concerned, will result in a signal level reaching meter 13, which is directly equal to the power reflected from the unit 25, at all frequencies throughout the frequency range of interest. Signal strength meter 13 will continuously indicate the reflected power, even while being tuned. Thus, the meter's electrical and mechanical time constants are much less of a problem than is usually encountered in the use of conventional equipment and methods. As in the previous embodiments of the invention, any error due to mistuning of the meter on a CW signal frequency is eliminated, as is the problem of frequency drift of either the CW generator or signal strength meter, or both.

In the practical application of this embodiment of the invention, the following procedure may be applied:

First, before connecting the unit to be tested to terminal 26, the measurement system such as exemplified in FIG. 1, should be prepared for return loss measurement. With no termination on return loss jack 26, and at any convenient frequency setting of meter 13 connected to terminal 16, the level of white noise signal generator 1 is adjusted for a convenient reference level on the signal strength meter 13, such as a unity calibration mark on a voltage scale, or a zero mark on a decibel scale. With no power being absorbed in a load, the return loss is now one, or zero dB. Now the unit to be measured, such as schematically indicated in FIG. 1 at 25, is connected to jack 26, signal strength meter 13 is tuned to the frequency desired. The signal to the meter represents the return loss of unit 25. For instance, if the meter reading drops to one tenth of the reference value, the return loss on a voltage scale would be (converting relative voltage to relative power) $0.1^2 = 0.01$, while on a decibel scale one should read $-20$ dB; and as quickly as meter 13 can be turned to other frequencies, the return loss can be observed, or data be acquired for plotting a return loss characteristic over the entire frequency range of interest. Maxima and minima of the return loss characteristic for the unit under test, and their frequencies, are quickly found, merely by tuning meter 13 to maxima and minima of deflection. Thus, for example, to determine how closely unit 25 approaches or exceeds a certain return loss specification, the operation of only a single control member will permit the zeroing-in on this critical information.

A further embodiment of the invention permits the measurement of length and the location of faults in cables or other transmission lines. Thus, for example, cable length, and the location of a fault in a coaxial cable, can be measured with substantially no additional circuitry or cost being necessary in a system, such as exemplified in FIG. 1. The nature of the signal derived from this circuitry permits this type of measurement with any ordinary signal strength meter covering an adequate frequency range. In conjunction with such a signal strength meter as schematically indicated in FIG. 1 at 13, it becomes necessary only to tune the meter to two frequencies of minimum response, and to note these frequencies accurately. White noise signal generator 1, emitting a signal of constant amplitude throughout the frequency range of interest, will cause a constant deflection of the signal strength meter, if it is connected to the center connector of a so-called TEE connector schematically indicated in FIG. 1 at 28, which in turn is connected to terminal 16. TEE connector 28 is a T-shaped junction of three connectors, one of which serves to connect to terminal 16, while the two other ones are connected to signal strength meter 13 and cable 29, respectively, the latter being the cable to be tested with respect to length or location of fault. With cable 29 under test being so connected, the cable impedance presented to TEE junction 28 will vary throughout the spectrum of white noise signal generator 1; and for a cable 29, which is open internally, or at the far end, at all those frequencies at which this cable has the length of an odd number of electrical quarter-wave lengths, the cable impedance presented to TEE junction 28 will be extremely low. Similarly, for a cable which is shorted internally, or at the far end, at all those frequencies at which the cable is an even number of electrical quarter-wave lengths long, the cable impedance presented to TEE junction 28 will also be extremely low. This low impedance present at TEE junction 28 greatly reduces the signal to signal strength meter 13. For both the open ended and the shorted condition, the frequency difference between any two consecutive frequencies at which the cable under test presents a low impedance to TEE junction 28, is exactly the frequency at which the cable under test is an electrical half-wavelength long.

In the practical application of this embodiment of the invention, and as an example, the following procedure may be adopted:

First, terminal 16 and a signal strength meter are connected to the terminals of the TEE junction such as illustrated in FIG. 1 at 28. At any convenient frequency setting of the meter, which again is exemplified by box 13, the white noise signal level of generator 1 is adjusted for a nearly full scale deflection on the signal strength meter 13. Then, the cable length to be measured is connected to TEE junction 28, as exemplified by 29. Thereafter, meter 13 is turned to either end of its tuning range and from there it is gradually tuned toward the midrange frequencies until a signal minimum is found. The frequency of this minimum is carefully noted. The tuning is then continued in the same direction until the next frequency minimum is found, and its frequency is also accurately noted. The frequency difference between these two noted frequencies represents the electrical half-wave length frequency of the cable 29 under test.

The actual cable length or the distance to a short or an open in the cable can be calculated from the following equation:

$$L = \frac{150}{f_{\lambda/2} \sqrt{\epsilon}} \text{ meters} = \frac{492.1}{f_{\lambda/2} \sqrt{\epsilon}} \text{ feet.}$$

where $f_{\lambda/2}$ is the electrical half-wave length frequency in MHz, and $\epsilon$ the effective dielectric constant of the cable under test.

In accordance with a further feature of the invention, improved accuracy may be obtained in the following manner:

Instead of stopping at the next consecutive signal minimum, the tuning of meter 13 is continued, say to the $n^{th}$ consecutive signal minimum, and its frequency is accurately noted. The electrical half-wave length of the cable under test is now represented by the difference between the two noted frequencies, divided by the factor $n$.

FIG. 2 exemplifies part of the circuitry shown in FIG. 1, in greater detail, and with certain specific improvements applied to the generation of the white noise signal, in accordance with certain other features of the invention.

In this circuitry, the wide band amplifier which amplifies the noise from the white noise generator, is designated at 30, and it is designed to permit the adjustment of the noise signal amplitude throughout the desired frequency spectrum. Amplifier 30 has five resistance-capacitance coupled transistor stages, schematically indicated at 31 to 35, with the collector circuits having essentially flat response throughout the desired frequency range. Further flattening of the noise spectrum is accomplished by means of adjustable, low impedance, resistance-capacitance networks in the transistor's emitter circuits. Thus, the more troublesome resonant circuits are not used to obtain the desired frequency response. With the frequency-determining characteristics of the emitter circuits being spaced across the desired frequency range, it is possible to achieve a white noise spectrum having less than plus or minus one dB variation throughout the desired frequency range. The white noise signal generator consists essentially of a noise diode schematically indicated in FIG. 2 at 36, preferably of the Zener type which, in accordance with a specific feature of the invention, is directly coupled to the base of amplifier transistor 37 so that the total diode biasing current flows into the base circuit of amplifier transistor 37. Measurements made with the noise diode being directly coupled to the base of the amplifier transistor, indicate the temperature coefficient of the output level to be less than ±0.002 dB/°F, from 74° to 30°F, and +0.01 dB/°F from 74° to 104°F. For the overall temperature range of 30° to 104°F the average temperature coefficient is +0.004 dB/°F. Measurements made with capacitively coupling of the noise diode to the base of the amplifier transistor, results in the output having a temperature coefficient of +0.2 dB/°F over the temperature range from 30° to 104°F. Thus, when directly coupled, the temperature characteristic of the noise diode nearly cancels the temperature characteristic of the amplifier.

While the invention has been described and illustrated by way of a number of examples, applications, and embodiments, and also in the form of systems and arrangements of circuits and circuit elements, the invention is not limited to the circuits, circuit elements and connections, nor to the measurements and methods therefor, shown or described, but may be applied within the skill of anyone familiar with the art of radio frequency measurements, without departing from the scope of this disclosure.

I claim:

1. A method for determining the absolute response of a device under test throughout a frequency range of interest by using a tunable instrument for measuring and indicating the power in a fixed bandwidth whose center frequency may be varied, comprising the steps of:
   a. tuning said instrument to a predetermined frequency,
   b. utilizing the instrument as tuned in step (a) to measure the response of the device under test to a continuous wave signal of predetermined amplitude whose frequency is the same as said predetermined frequency, and
   c. varying the center frequency of said instrument over the frequency range of interest in order to measure the response of the device under test to a white noise signal of uniform amplitude throughout said frequency range of interest, after first adjusting the amplitude of said white noise signal so that the measurement indicated by said instrument while it is tuned to said predetermined frequency is the same as the measurement indicated in step (b).

2. A method for determining the absolute response of a tunable instrument throughout a frequency range of interest, said instrument being operative to measure and indicate the power in a fixed bandwidth whose center frequency may be varied, comprising the steps of:
   a. tuning said instrument to a predetermined frequency,
   b. measuring the response of the instrument as tuned in step (a) to a continuous wave signal of predetermined amplitude whose frequency is the same as said predetermined frequency, and
   c. varying the center frequency of said instrument over the frequency range of interest in order to determine its response to a white noise signal of uniform amplitude throughout said frequency range of interest, after first adjusting the amplitude of said white noise signal so that the measurement indicated by said instrument while it is tuned to said predetermined frequency is the same as the measurement indicated in step (b).

3. A system for determining the absolute response of a device under test throughout a frequency range of interest comprising a tunable instrument for measuring and indicating the power in a fixed bandwidth whose center frequency may be varied, and signal generating means, the device under test being connected between said signal generating means and said instrument such that said instrument measures and indicates the response of said device under test to the signal furnished thereto by said signal generating means, said signal generating means including means for generating a continuous wave signal of predetermined amplitude and frequency, white noise signal generating means, means for selectively applying one of said continuous wave and white noise signals to said device under test, and means for adjusting the amplitude of said white noise signal such that said instrument indicates the same measurement while it is tuned to said predetermined frequency when each of said continuous wave and white noise signals is applied to said device under test.

4. A system for determining the absolute response of a tunable instrument throughout a frequency range of interest, said instrument being operative to measure and indicate the power in a fixed bandwidth whose center frequency may be varied, comprising signal generating means for connection to said instrument such that said instrument indicates its response to the signal applied thereto by said signal generating means, said signal generating means including means for generating a continuous wave signal of predetermined amplitude and frequency, white noise signal generating means, means for selectively applying one of said continuous wave and white noise signals to said instrument, and means for adjusting the amplitude of said white noise signal such that said instrument indicates the same measurement while it is tuned to said predetermined frequency when each of said continuous wave and white noise signals is applied thereto.

* * * * *